United States Patent [19]

Rehm et al.

[11] Patent Number: 4,871,673

[45] Date of Patent: Oct. 3, 1989

[54] PROCESS FOR THE DECONTAMINATION OF SOIL BY MEANS OF MICROORGANISMS

[76] Inventors: Hans J. Rehm, Ludwig, Wokertstrasse 17, 4400 Münster; Kurt Kirchner, Im Wingert 33, 6236 Eschborn/TS, both of Fed. Rep. of Germany

[21] Appl. No.: 87,306

[22] Filed: Aug. 20, 1987

[51] Int. Cl.⁴ .......................... C12N 11/00; C12P 1/00
[52] U.S. Cl. ..................................... 435/262; 435/176; 435/264
[58] Field of Search .................... 435/264, 176, 262

[56] References Cited

U.S. PATENT DOCUMENTS 4,332,904  6/1982  Kurane et al. ...................... 435/176
4,415,662 11/1983  Thirumalachar et al. .......... 435/176
4,447,541  5/1984  Peterson ............................. 435/264

OTHER PUBLICATIONS

Nelson–Chem. Abst. vol. 104(1986) 104,338q.
Nelson L. (1982), Soil Biol. Biochem. 14:219–222.

*Primary Examiner*—Sam Rosen
*Attorney, Agent, or Firm*—Keil & Weinkauf

[57] ABSTRACT

A process for the decontamination of soil is disclosed wherein specific microorganisms are fixed at a high cell concentration to a porous and adsorptive carrier; and applied to contaminated soil to bring about decontamination.

6 Claims, No Drawings

PROCESS FOR THE DECONTAMINATION OF SOIL BY MEANS OF MICROORGANISMS

The invention relates to a process for the decontamination of soil by means of microorganisms.

The decontamination of soil that is contaminated by organic compounds, such as heating oil, chemicals, etc., is of considerable practical importance.

Areas of soil are stressed by more or less harmful substances as a result of present-day accidents and damaging events and are endangered by already existing previously occurred stress that often dates back to the effects of war.

These substances that are located in the soil may seep into the ground water and contaminate it. Contaminations of this type are particularly harmful if they are located in the proximity of catchment areas.

When there is the danger that ground water may be contaminated, the owners of real estate property may be asked to eliminate the contamination to the extent that there is no longer any danger to the water.

Often the owners are small and medium-sized businesses for whom the costs that are connected with the decontamination of soil represent a considerable financial burden.

A known possibility of decontamination is the lifting-out of contaminated soil and transporting it to a suitable depositing site. Another possibility consists of heating the contaminated soil in a rotating tubular kiln to such a degree that the organic compounds burn.

Both processes have the disadvantage that they are comparatively costly.

It is also known to remove contaminations of the soil caused by leaked heating oil or mineral oil by lowering the ground water and pumping out the oil in phase for the most part from soil. The disadvantage of this method consists of the fact that a remainder of heating oil stays in the soil. It may be slowly rinsed out by rain water and then reach the ground water.

From G. Battermann and P. Werner: "Elimination of an Underground Contamination by Means of Hydrocarbons Through Microbial Decomposition"; *Gas Wasserfach, Wasser Abwasser* 125, No. 8, 366–373 (1984); and G. Battermann: "Elimination of an Underground Contamination by Means of Hydrocarbons Through Microbial Decomposition", *Chem. Ing. Tech.* 56, No. 12, 926–928 (1984), a biological process is known by means of which the organic compounds remaining in the soil, mainly aliphatic and aromatic hydrocarbons, can be removed to such an extent that there is no longer any danger of a contamination of the ground water. The process only uses microorganisms that naturally occur in the soil.

This process has the disadvantage that it is very time-consuming (about 80% of the existing contaminations had not been decomposed before 10 months had gone by.) By means of the relatively low cell densities existing in biologically active earth masses, only a very slow decomposition of the harmful substances can be achieved. In addition, little knowledge exists concerning the individual processes that occur so that a targeted decomposition of the harmful substances is not possible and a sufficient effectiveness is not ensured.

The invention is based on the objective of providing a process for the decontamination of soil by means of which a costeffective, rapid and thorough soil rebuilding is possible.

This objective is achieved according to the invention in the case of a process of the above-mentioned type by bringing into the soil layers that are contaminated by one or several organic harmful substances harmful-substance-specific microorganisms in a free or a fixed form at a high concentration in the presence of water, oxygen and mineral salts.

By means of the process according to the invention, soil that is contaminated by organic harmful substances can be decontaminated economically, very rapidly and effectively.

In many cases of technical damage and old stress, in contrast to waste dumps, largely known substances are present so that, by means of the process according to the invention, a targeted use of microorganisms is possible.

"Harmful-substance-specific microorganisms" are cultures that absorb the respective harmful substance as a substrate and decompose it.

The decomposition of alkanes and aromatic compounds is known. A number of texts exist in which the biological decomposition kinetics of alkanes and aromatic compounds are described (compare H.-J. Rehm and I. Reiff, "Mechanisms and Occurrence of Microbial Oxidation of Long-Chain Alkanes," *Advan. Biochem. Eng.* 19, 175–215 (1981); H. Bettmann and H.-J. Rehm, "Degradation of Phenol by Polymer Entrapped Microorganismus", *Appl. Microbiol. Biotechnol.* 20, 285–290 (1984), and H. M. Ehrhardt and H.-J. Rehm, "Phenol Degradation by Microorganisms Adsorbed on Activated Carbon," *Appl. Microbiol. Biotechnol.* 21, 32–36 (1985). From DE-OS 33 45 944, it is also known that a number of aliphatic compounds can be decomposed by pseudomonas fluorescens and rhodococcus sp.

By means of the process according to the invention, so-called "taylored" microorganism cultures in concentrated form may be used for the respective contaminating substances.

The cell densities that are to be achieved by means of the process according to the invention in the soil masses to be contaminated may be up to a factor $10^6$ higher than those existing in biological soil masses, as will be explained in detail in the following.

In an embodiment of the process according to the invention, the microorganisms are brought into the contaminated soil in a free form as an aqueous suspension of harmful-substance-specific monocultures.

The application can take place by means of conventional irrigation systems or mobile devices, as they are used, for example, for the application of liquid fertilizer and similar dust substances.

The cell concentration in the suspensions should be about $10^9$–$10^{10}$ per $cm^3$.

The amount of microorganisms to be brought into the soil depends on the degree of contamination and the type of soil. The cell density to be achieved in the soil, however, should not be less than $10^6$ per $cm^3$.

After the desired cell density is reached, the supply of microorganisms is interrupted, but a further irrigation of the soil with mineral-containing water takes place, preferably, however, with a special aqueous mineral solution. Suitable mineral solutions are described in Kirchner K., Kräamer, P., Rehm, H.-J.: *Biotechnol. Lett.* 3 (1981), No. 10, Page 567/570 and *Verfahrenstechnik* (Mainz) 17 (1983), Page 676).

In a further embodiment of the process, harmful-substance specific monocultures or mixed cultures are fixed at carriers.

This can take place either by the fact that a carrier material is placed in the soil and is subsequently, as mentioned above, irrigated with an aqueous microorganism suspension and then with an aqueous mineral solution.

The amount of carrier material to be placed in the soil depends on various factors, such as the amount of the contamination that is to be removed, the type of soil and the amount and type of the microorganisms to be fixed. However, it should be in the following range of carrier material: soil between $1:10^2$ to $1:10^4$ (volume).

A particularly preferred embodiment consists of the fact that the harmful-substance-specific monocultures and/or mixed cultures of microorganisms before they are placed in the soil, are fixed at a carrier, and the thus obtained bio-catalyst is mixed uniformly with soil and is subsequently irrigated, as described above, with an aqueous mineral solution.

The placing of immobilized microorganisms in the soil is particularly preferred because, as a result, two effects are achieved:

1. Particularly actively decomposing strains can be used in a targeted way for the concerned materials. As a result, different soil contaminations can be fought in a more targeted way than previously.

2. The cell densities is contaminated soil masses can be increased further so that the efficiency of the rehabilitation process is increased.

3. Microorganisms are used that are selected and grown specifically for the decomposition of the soil-contaminating substances and that, because of the immobilizing, remain in the contaminated area.

Among the carrier materials that can be used in the two embodiments are activated carbon, zeolite and silica gel. The criterion for the carrier material is that it is porous, has a high inner pore surface, for example, in the range of 100 to 1,500 m²/g, and is adsorptive with respect to the harmful substances. Among the mentioned carrier materials, activated carbon proved to be the most suitable. Among the different types of activated carbon, those types proved to be particularly suitable that, in addition to the high inner surface, have a high surface adsorption capacity.

Zeolites, also called aluminosilicates, in addition to having a large surface and a high adsorption capacity, are also crystalline, because of their defined crystal structure, have a physical arrangement of identically constructed hollow adsorption spaces that are accessible via pore openings that have the same size, and as a result, are able to act as a moleculare sieve. Because of their molecular sieve effect, they are selective with respect to harmful substances, making it possible to further increase, in the case of the selection of the zeolites with a view to their use, their adsorption capacity with respect to the harmful substance to be removed.

The bio-catalysts, in the case of which the microorganisms are fixed at the carrier before being placed in the soil, are produced by the fact that the carrier material is brought into contact with the microorganisms suspension that is suitable for the harmful substance to be decomposed. The contacting takes place by means of a so-called flowing of the microorganisms suspension around the carrier material, i.e., a relative movement between the solid core and the fluid phase. Preferably, this takes between by irrigation. The contacting must take place for so long until an approximate cell saturation charge has occurred. This may take between 1 to 5 hours.

The use of a number of bio-catalysts in the case of the purification of exhaust gas and their production are known from DE-OS 33 45 944.

When different soil contaminations located in one soil layer are to be fought, for example, several biocatalysts may be placed in the soil to which different monocultures are fixed that particularly actively decompose the respective harmful substance.

The placing of the carrier materials as well as of the microorganisms fixed at the carrier in the soil may take place by means of conventional soil tilling equipment Depending on how deeply the harmful substances have penetrated into the soil and how deeply therefore the materials must be placed in the soil, the placing in the soil can take place, for example, by plowing, soil-ameliorating equipment, such as deep-soil-losening equipment or excavators.

According to the circumstances, the liquid that arrives in the soil by means of the microorganism suspension and/or the aqueous mineral solution, can be left to seep into the soil, or the liquid can be pumped out by means of drainage pipes let into the soil. Even though the oxygen that is supplied to the soil by means of the irrigation solution in principle is sufficient for providing for the microorganisms, it may be advantageous to enrich the pumped out liquid with oxygen and to spray it out again.

The pump-off method also offers the possibility that harmful substances that possibly may not yet have been biologically decomposed and that may be contained in the water, may be cleaned biologically outside the soil layers.

A further development of the development of the process according to the invention consists of the fact that a separating layer consisting of a bio-catalyst is placed between the contaminated and the uncontaminated soil areas. As a result, the moving of the harmful substances into the uncontaminated area of the soil is prevented. This embodiment may be used in connection with all other embodiments that are described above. However, as a prenventative measure, it may also be used alone. Care must be taken in this case that sufficient moisture, mineral substances and oxygen are supplied.

The following figure and examples have the purpose of further explaining the invention.

FIG. 1 is a graphic representation of the cell charging of different carrier materials as a function of the contact time.

The symbols used in the figure and in the examples have the following meaning:

A or AK = activated carbon
X = microorganism density/ volume liquid phase
$X_y$ = microorganism density/volume fixed-bed phase
$t_B$ = contact time
TS = dry substrate
$v_1$ = liquid flow
$X_m$ = microorganism density / carbon composition

EXAMPLE 1

Production and Testing of the Biocatalysts That Can be Used According to the Invention Several biocatalysts that can be used according to the invention were produced by irrigating bulks of various cell-free A-carbon types that are characterized in greater detail in Table 1 with a bacteria suspension of pseudomonas fluorescens (DSM 50090) (cell density X =0.725 g TS/1, $V_1$ =8.8 1/h)in the irrigation bed reactor for three to four hours at room temperature in the recirculating system.

The adsorbed cell mass was determined indirectly by means of the continuous recording of the optical density of the bacteria suspensions in a secondary circulating system via a previously set up calibrating diagram.

The values for the time-related charging $X_v$ (referring to 1 cm$^3$ reactor volume) that were achieved in this case are shown in FIG. 1.

It was found that the broken A-carbon (AK I) with a high surface roughness (as compared to the AK II) and a high inner pore surface has the most favorable adsorbent characteristics. In addition to the high affinity of the microorganisms with respect to the carrier material, the outer surface structure of the carrier material is therefore also important.

The pourings of A-carbon, with the respective cell density $X_v$, were charged with a (cell-free) mineral salt solution of the following composition: $K_2HPO_4$ 0.5 g, $MgSO_4 . 7H_2O$ 0.2 g, $FeSO_4 . 7H_2O$ 0.01 g, $CaCl_2$ 0.01 g, $NH_4NO_3$ 3.0g $(NH_4)_2SO_4$ 2.5 g, trace element solution 1 ml (Pfennig N. Lippert KG (1966), *Arch. Mikrobiol.* 55: 245:256) to 1,000 ml deionized water, and it was determined that—as shown by the interrupted lines in FIG. 1—there was no significant bacteria desorption.

Thus a largely irreversible adsorption took place. The values for the cell density to be maximally achieved are listed in Table 2.

If the cell densities that can be achieved with the carrier material that can be used according to the invention are compared with those of biologically active soil masses, these are higher by the factor $10^6$. (According to Batternmann: 5,000 active bacteria in 1 g of soil mass; cells adsorbed according to the invention on 1 g A-carbon: g.o. $10^9$).

EXAMPLE 2

The approach was as in Example 1, but A-carbon of the Type AG 33/1-4 and D45/2, grain cl. width 1-4 mm of Bergbauforschung (Mining Research) Essen was used and additional microorganism species. The individual used microorganisms, the cell density to be maximally achieved and the harmful substances that can be decomposed as a result can be found in Table 2.

EXAMPLE 3

Decomposition of Water-Soluble Harmful Substances by Means of Microorganism Charging Without a Carrier A pipe reactor that was filled with 200 g of sand (soil layer) of a grain size of 0.3 to 1.2 mm was sprayed evenly with a bacteria suspension of pseudomonas fluorescens (DSM 50090) of an optical density of ~1, which corresponds to a cell concentration of ~$10^9$ bact./ml. The bacteria were located in the growth phase. The optical density of the discharging liquid was measured continuously. The liquid was kept in circulation by means of a hose pump ( 4 1/h). The overall liquid volume was 200 ml. After about two hours, about 60% of the bacteria were located in the sane layer. Subsequently, the bacteria suspension was replaced by a bacteria-free mineral solution of the composition indicated in Example 1 and was circulated as described.

Subsequently, 5 ml of a propionaldehyde solution (harmful substance to be decomposed) (1 ml aldehyde/ 1,000 ml $H_2O$) were added to the storage receptacle. After 40 minutes, samples were taken at the bottom of the sand layer. The aldehyde concentration had fallen from about $4.8 . 10^{-4}$ mol/l to $0.24 .10^{-4}$ mol/l. This corresponds to a decomposition rate of $0.7 . 10^{-6}$ mol/h in 1 cm$^3$ of sand.

A blank test without bacteria showed that the aldehyde was adsorbed at the sand layer in an unmeasureable way, which proved that the decomposition took place by means of the bacteria.

EXAMPLE 4

Decomposition of Water-Soluble Harmful Substances by Means of Microorganisms Fixed at a Carrier 20 g of a biocatalyst made according to Example 1, using AK I as carrier material, were mixed with 200 g of sand.

The decomposition rate of propionaldehyde in a poured volume of 1 cm$^3$, in the case of an operating method according to Example 3, was around $1.2 . 10^{-6}$ mol/h. This is about 1.7 times that of Example 3.

TABLE 1

| ACTIVATED CARBON TYPES | | | | | | | | |
|---|---|---|---|---|---|---|---|---|
| A - Carbon | Raw Mat. | Grain Cl. Breadth" | Shape | BET Surface | Z Grain Volume" $\epsilon H$ | Pore Moisture" $\epsilon 9$ | Stat. Moisture" $\epsilon 5$ | Compacted Apparent Density" $\epsilon t$ |
| I Al-carbon (Lurgi) | Hard Coal | 2-2.5 mm | Broken Coal | $1,250 \frac{m^2}{g}$ | 0.44 | 0.31 | 0.19 | 0.39 |
| II Hydraffin AS 22 (Lurgi) | " | " | Shaped Coal | $1,400 \frac{m^2}{g}$ | 0.49 | 0.20 | 0.20 | 0.38 |
| III Filtrilur VA (Lurgi) | " | " | Broken Coal | $100 \frac{m^2}{g}$ | 0.42 | 0.17 | 0.18 | 0.58 |

"determined experimentally

TABLE 2

| A-Carbon | Microorganisms | $X_M^{max}$/Microorg · g$^{-1}$ | DSM No. | Harmful Substances to Be Assigned |
|---|---|---|---|---|
| I | P. fluorescens | $9.0 . 10^9$ | 50090 | Propionaldehyde, Butanol, Ethyl Acetate, Methyl Ethyl Ketone, Acetone |

TABLE 2-continued

| A-Carbon | Microorganisms | $X_M^{max}$/Microorg · $g^{-1}$ | DSM No. | Harmful Substances to Be Assigned |
| --- | --- | --- | --- | --- |
| II | P. fluorescens | $9.2 \cdot 10^9$ | 50090 | Propionaldehyde |
| III | P. fluorescens | $4.0 \cdot 10^9$ | 50090 | Propionaldehyde |
| Type AG 33/1-4 and D 45/2 | P. putida | $4 \cdot 10^9$ | 50198 | Phenols, Cresols, Aromatic Compounds, Alkanes |
| Type AG 33/1-4 and D 45/2 | Crytococcus elinovii | $3 \cdot 10^8$ | | Phenols, Cresols |
| D 45/2 | Candida parapsiloses | $4 \cdot 10^8$ | 70125 | Alkanes, phenols, cresols |

We claim:

1. A process for the decontamination of soil containing harmful substances using harmful-substance-specific microorganisms comprising bringing harmful-substance-specific microorganisms into soil contaminated with one or more harmful substances in the presence of water, oxygen and mineral salts, said microorganisms being fixed at a high cell concentration to a porous carrier material that is adsorptive with respect to a harmful substance and has a high inner pore surface of from 100 to 1,500 m²/g, the microorganisms having been fixed to said carrier by contacting the carrier material with a suspension of the microorganisms for a sufficient length of time to effect an approximate cell saturation charge, whereby said microorganisms fixed to said carrier support decompose said harmful substance to decontaminate the soil.

2. The process of claim 1 wherein said carrier material is brought into the soil and is then irrigated with an aqueous suspension of said harmful-substances-specific microorganisms to fix said microorganisms to said carrier material.

3. The process of claim 2 wherein, following irrigation with said aqueous suspension of microorganisms, the carrier is irrigated with an aqueous mineral solution.

4. The process of claim 1 wherein said carrier material is irrigated with an aqueous suspension of said harmful-substance-specific microorganisms to fix said microorganisms to said carrier material before it is brought into the soil, the carrier fixed with said microorganisms is brought into the soil and the soil is irrigated with an aqueous mineral solution.

5. The process of claim 1 wherein said carrier is activated carbon.

6. The process of claim 1 wherein aqueous liquid in the soil is pumped out of the soil by drainage pipe means present in the soil, the liquid is enriched with oxygen and then placed back into the soil.

* * * * *